(12) United States Patent
Lu et al.

(10) Patent No.: US 7,078,128 B2
(45) Date of Patent: *Jul. 18, 2006

(54) CATHODE COMPOSITIONS FOR LITHIUM-ION BATTERIES

(75) Inventors: Zhonghua Lu, Halifax (CA); Jeffrey R. Dahn, Hubley (CA)

(73) Assignee: 3M Innovative Properties Company, St. Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 11/052,323

(22) Filed: Feb. 7, 2005

(65) Prior Publication Data

US 2005/0170249 A1 Aug. 4, 2005

Related U.S. Application Data

(63) Continuation of application No. 09/845,178, filed on Apr. 27, 2001, now Pat. No. 6,964,828.

(51) Int. Cl.
*H01M 4/50* (2006.01)

(52) U.S. Cl. ............... 429/231.95; 429/224; 252/182.1

(58) Field of Classification Search ........... 429/231.95, 429/218.1, 219, 222, 223, 224, 231.6, 231.3, 429/221; 252/182.1
See application file for complete search history.

(56) References Cited

U.S. PATENT DOCUMENTS

| | | | |
|---|---|---|---|
| 4,567,031 A | 1/1986 | Riley | |
| 5,264,201 A | 11/1993 | Dahn et al. | |
| 5,292,601 A | 3/1994 | Sugeno et al. | |
| 5,370,948 A | 12/1994 | Hasegawa et al. | |
| 5,393,622 A * | 2/1995 | Nitta et al. | 429/223 |
| 5,478,671 A | 12/1995 | Idota | |
| 5,478,675 A | 12/1995 | Nagaura | |
| 5,521,027 A | 5/1996 | Okuno et al. | |
| 5,525,443 A | 6/1996 | Okuno et al. | |
| 5,531,920 A | 7/1996 | Mao et al. | |
| 5,565,688 A | 10/1996 | Hayashi | |
| 5,589,300 A | 12/1996 | Fauteux et al. | |
| 5,609,975 A | 3/1997 | Hasegawa et al. | |
| 5,626,635 A | 5/1997 | Yamaura et al. | |
| 5,742,070 A | 4/1998 | Hayashi et al. | |
| 5,770,173 A | 6/1998 | Nitta et al. | |
| 5,783,332 A | 7/1998 | Amine et al. | |
| 5,858,324 A | 1/1999 | Dahn et al. | |
| 5,900,385 A | 5/1999 | Dahn et al. | |
| 5,911,920 A | 6/1999 | Hasezaki et al. | |
| 5,981,445 A | 11/1999 | Kirchnerova et al. | |
| 5,993,998 A | 11/1999 | Yasuda | |
| 6,017,654 A | 1/2000 | Kumta et al. | |
| 6,030,726 A | 2/2000 | Takeuchi et al. | |
| 6,040,090 A | 3/2000 | Sunagawa et al. | |
| 6,077,496 A | 6/2000 | Ito et al. | |
| 6,103,422 A | 8/2000 | Kanai | |
| 6,168,887 B1 | 1/2001 | Dahn et al. | |
| 6,214,493 B1 | 4/2001 | Bruce et al. | |
| 6,270,925 B1 | 8/2001 | Takada et al. | |
| 6,333,128 B1 * | 12/2001 | Sunagawa et al. | 429/231.95 |
| 6,361,756 B1 | 3/2002 | Gao et al. | |
| 6,368,749 B1 * | 4/2002 | Yanai et al. | 429/231.1 |
| 6,372,385 B1 | 4/2002 | Kweon et al. | |
| 6,521,379 B1 | 2/2003 | Nishida et al. | |
| 6,551,744 B1 | 4/2003 | Ohzuku et al. | |
| 6,589,499 B1 | 7/2003 | Gao et al. | |
| 6,589,694 B1 | 7/2003 | Gosho et al. | |
| 6,620,400 B1 | 9/2003 | Gao et al. | |
| 6,660,432 B1 | 12/2003 | Paulsen et al. | |
| 6,677,082 B1 | 1/2004 | Thackeray et al. | |
| 6,680,143 B1 | 1/2004 | Thackeray et al. | |
| 2001/0010807 A1 | 8/2001 | Matsubara | |
| 2002/0086210 A1 | 11/2001 | Naruoka et al. | |
| 2002/0012843 A1 | 1/2002 | Munakata et al. | |
| 2002/0053663 A1 | 5/2002 | Ito et al. | |
| 2002/0150530 A1 | 10/2002 | Gao et al. | |
| 2003/0022063 A1 * | 1/2003 | Paulsen et al. | 429/231.3 |
| 2003/3082452 | 5/2003 | Ueda et al. | |

FOREIGN PATENT DOCUMENTS

| | | |
|---|---|---|
| EP | 0 501 187 | 4/1996 |
| EP | 0 813 256 | 12/1997 |
| EP | 0 903 796 | 3/1999 |
| EP | 0 944 125 | 9/1999 |
| EP | 0 468 942 B2 | 12/1999 |

(Continued)

OTHER PUBLICATIONS

Numata, K. et al., *Preparation and electrochemical properties of layered lithium-cobalt-manganese oxides*, Solid State Ionics, 118(1999) pp. 117-120.

Numata K. et al., *Synthesis of Solid Solutions in a System of $LiCoO_2$-$Li_2MnO_3$ for Cathode Materials of Secondary Lithium Batteries*, The Chemical Society of Japan, (1997), pp. 725-726.

Numata K. et al, *Synthesis and characterization of layer structured solid solutions in the system of $LiCoO_2$-$Li_2MnO_3$*, Solid State Ionics 117 (1999) pp. 257-263.

(Continued)

*Primary Examiner*—Michael Barr
*Assistant Examiner*—Monique Wills
(74) *Attorney, Agent, or Firm*—Dorothy P. Whelan; Lucy C. Weiss; Dean M. Harts

(57) ABSTRACT

A cathode composition for a lithium-ion battery having the formula $Li[M^1_{(1-x)}Mn_x]O_2$ where $0<x<1$ and $M^1$ represents one or more metal elements, with the proviso that $M^1$ is a metal element other than chromium. The composition is in the form of a single phase having an O3 crystal structure that does not undergo a phase transformation to a spinel crystal structure when incorporated in a lithium-ion battery and cycled for 100 full charge-discharge cycles at 30° C. and a final capacity of 130 mAh/g using a discharge current of 30 mA/g.

22 Claims, 13 Drawing Sheets

FOREIGN PATENT DOCUMENTS

| | | |
|---|---|---|
| EP | 1 117 145 | 7/2001 |
| EP | 1 189 296 A2 | 3/2002 |
| JP | 86055747 | 3/1980 |
| JP | 05-067466 | 3/1993 |
| JP | 05-182667 | 7/1993 |
| JP | 05-198301 | 8/1993 |
| JP | 05-283077 | 10/1993 |
| JP | 06-275264 | 9/1994 |
| JP | 06-275269 | 9/1994 |
| JP | 07-134985 | 5/1995 |
| JP | 07-235291 | 9/1995 |
| JP | 07-235292 | 9/1995 |
| JP | 8-37007 | 2/1996 |
| JP | 08-171935 | 7/1996 |
| JP | 8-213015 | 8/1996 |
| JP | 08-315819 | 11/1996 |
| JP | 2561556 | 12/1996 |
| JP | 2668678 | 10/1997 |
| JP | 2699176 | 1/1998 |
| JP | 10-188982 | 7/1998 |
| JP | 2822659 | 11/1998 |
| JP | 11-364156 | 12/1999 |
| JP | 2000-173599 | 6/2000 |
| JP | 2000-173667 | 6/2000 |
| JP | 2000-195514 | 7/2000 |
| JP | 2000/223122 | 8/2000 |
| JP | 2000-223157 | 8/2000 |
| JP | 2000-231919 | 8/2000 |
| JP | 3079382 | 8/2000 |
| JP | 2000-268821 | 9/2000 |
| JP | 2000-277151 | 10/2000 |
| JP | 2000-294240 | 10/2000 |
| JP | 2000-294242 | 10/2000 |
| JP | 2000-323123 | 11/2000 |
| JP | 2000-323142 | 11/2000 |
| JP | 2000-327339 | 11/2000 |
| JP | 2001-052702 | 2/2001 |
| JP | 2001-146426 | 5/2001 |
| JP | 3197763 | 8/2001 |
| JP | 2002/042813 | 2/2002 |
| JP | 2002-063900 | 2/2002 |
| WO | WO 97/26683 | 7/1997 |
| WO | WO00/23380 | 4/2000 |
| WO | WO 02/40404 A1 | 5/2002 |

OTHER PUBLICATIONS

Armstrong and Bruce, "Synthesis of layered $LiMnO_2$ as an electrode for rechargeable lithium batteries," *Nature*, 1996, 381:499-500.

Dahn et al., "Structure and Electrochemistry of $Li_2Cr_2Mn_{2-x}O_4$ for $1.0 \leq x \leq 1.5$," *J. Electrochem. Soc.*, 1998, 145(3):851-859.

Delmas et al., "Soft chemistry in $A_2MO_2$ sheet oxides," *Revue de Chimie Minérale*, 1982, 19:343-351.

DeSilvestro, "Pacific Lithium Limited—Novel layered cathode materials for advanced lithium ion batteries," presented at May 2000 International Li Battery Conference, Como, Italy.

Hill and Howard, "Peak Shape Variation in Fixed-Wavelength Neutron Powder Diffraction and its Effect on Structural Parameters Obtained by Rietveld Analysis," *J. Appl. Cryst.*, 1985, 18:173-180.

Naruoka et al., "Development of $Lini_{1-x-y}Co_xMn_yO_2$ System Positive Active Material for Lithium Ion Cells," *GS News Technical Report*, 2000, 59(2):13-17 (Translation attached).

Neudecker et al., "Lithium Manganese Nickel Oxides $Li_x(Mn_yNi_{1-y})_{2-x}O_2$," *J. Electrochem. Soc.*, 1998, 145(12):4160-4168.

Paulsen and Dahn, "02 Structure $Li_{2/3}[Ni_{1/3}Mn_{2/3}]O_2$: A New Layered Cathode Material for Rechargeable Lithium Batteries," *J. Electrochem. Soc.*, 2000, 147(3):861-868.

Rossen et al., "Structure and electrochemistry of $Li_xMn_yNi_{1-y}O_2$," *Solid State Ionics*, 1992, 57:311-318.

Wiles and Young, "A new computer program for Rietveld analysis of X-ray powder diffraction patterns," *J. Appl. Cryst.*, 1981, 14:149-151.

* cited by examiner

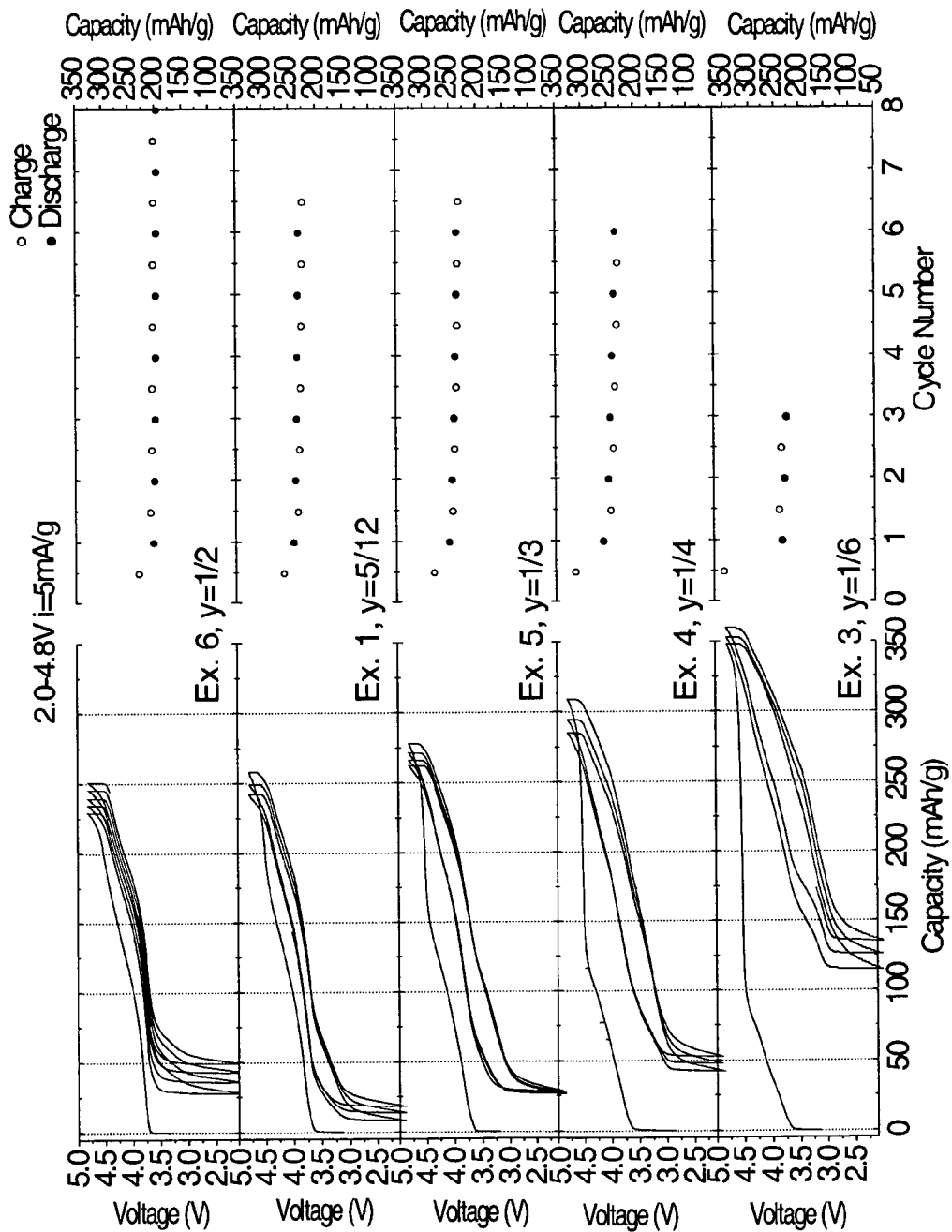

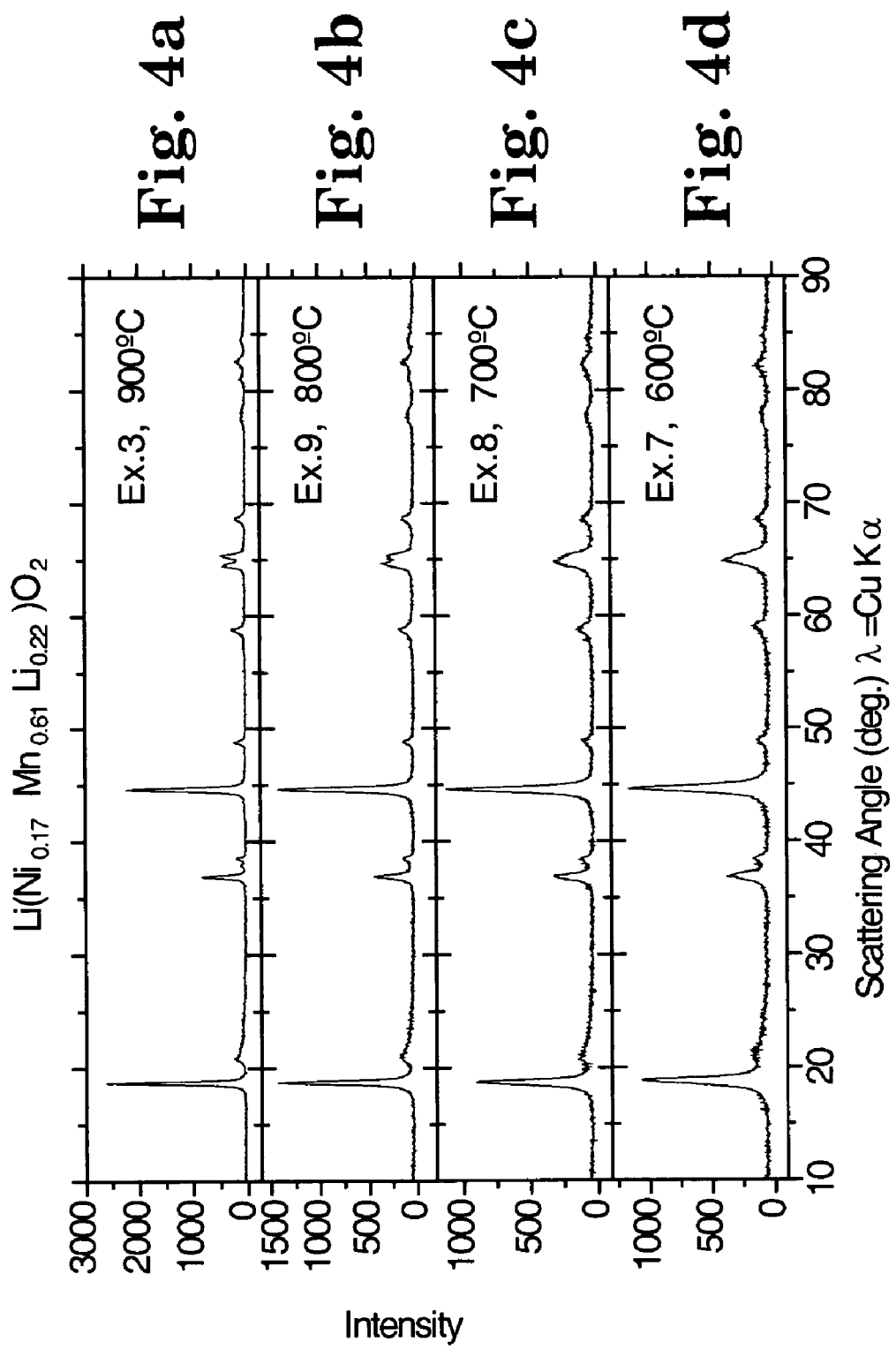

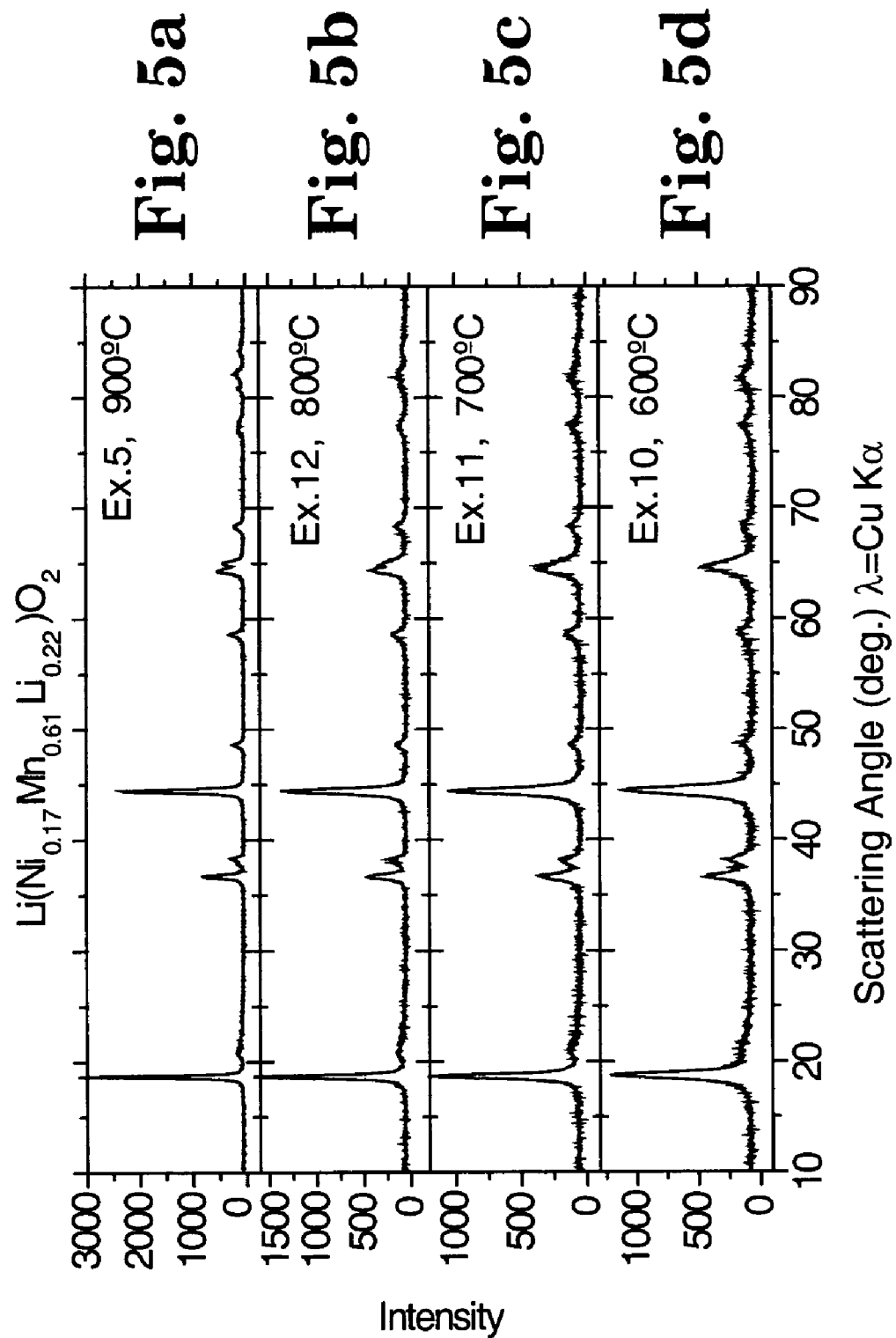

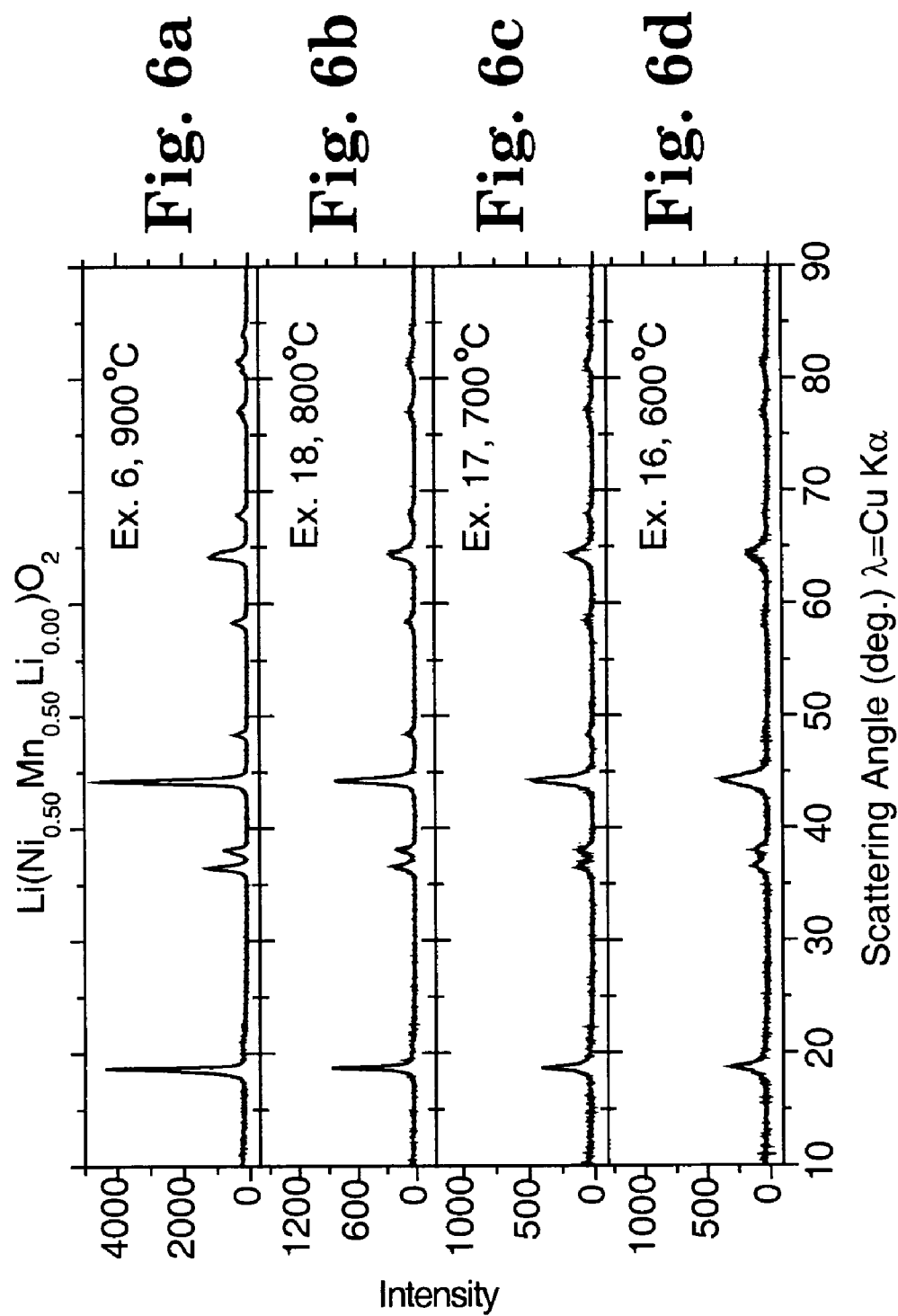

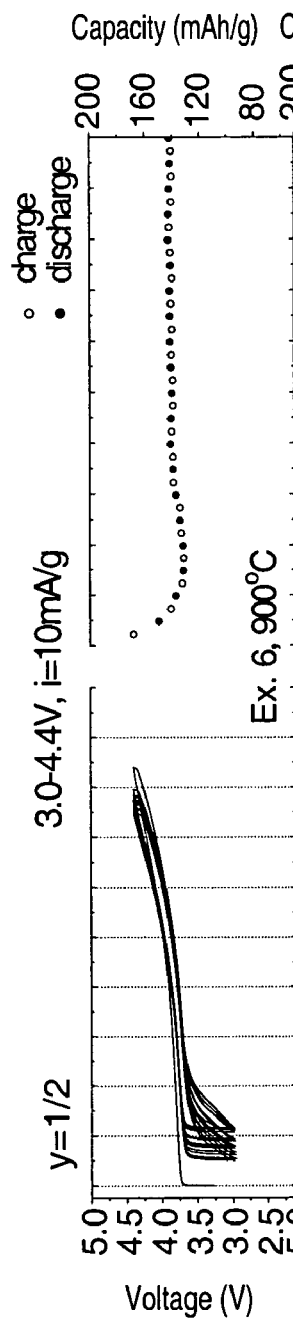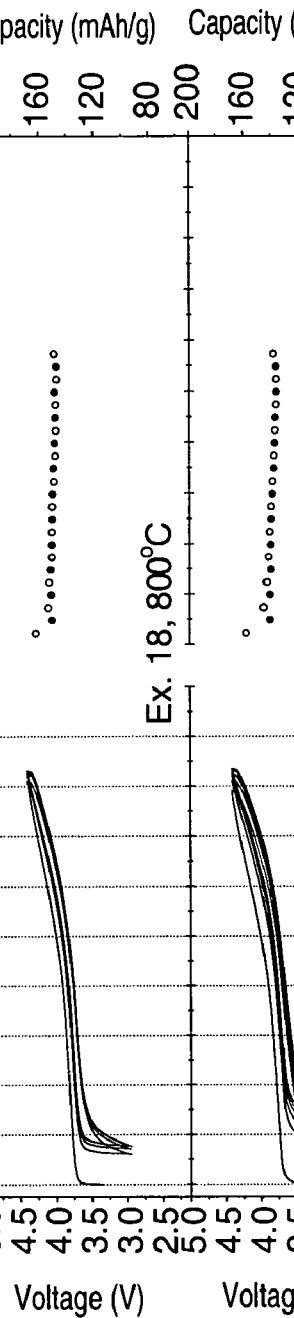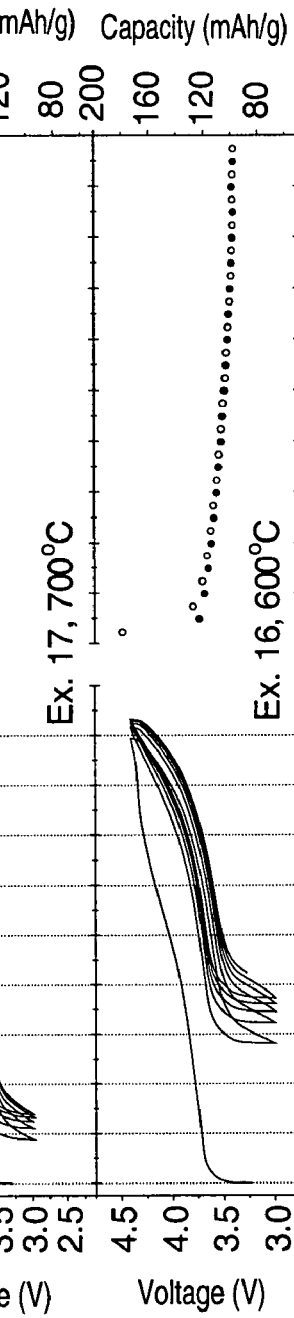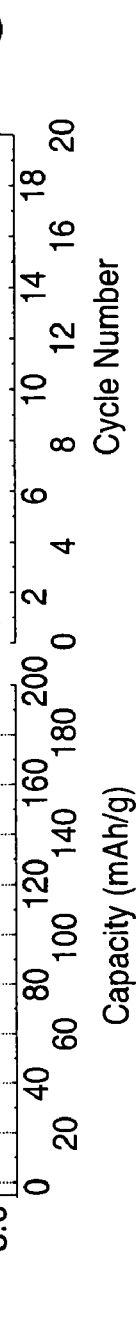
Fig. 7a
Fig. 7b
Fig. 7c
Fig. 7d

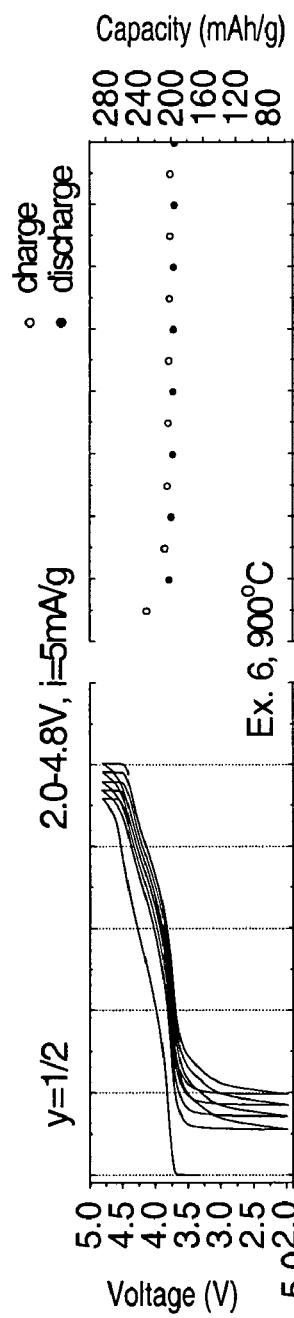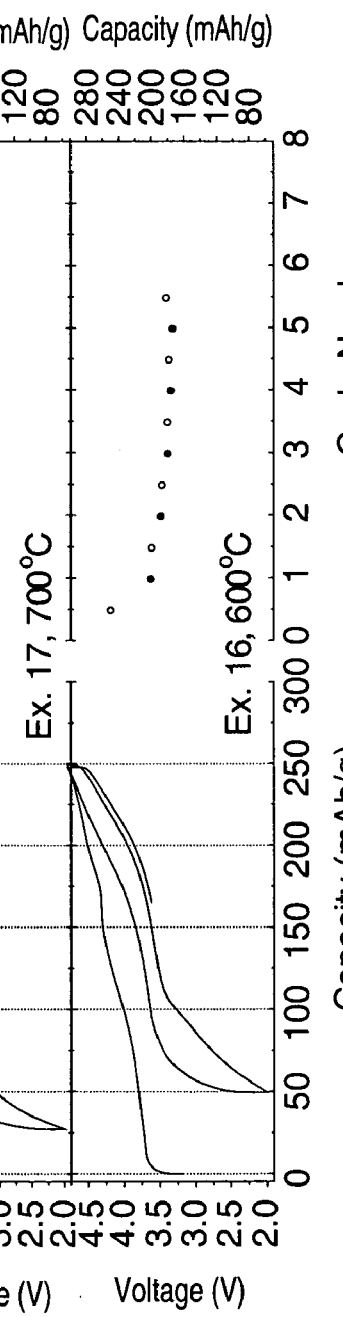
Fig. 8a
Fig. 8b
Fig. 8c
Fig. 8d

CATHODE COMPOSITIONS FOR LITHIUM-ION BATTERIES

STATEMENT OF PRIORITY

This application is a continuation of application Ser. No. 09/845,178 filed Apr. 27, 2001 issued as U.S. Pat. No. 6,964,828, and claims the priority thereof.

TECHNICAL FIELD

This invention relates to preparing compositions useful as cathodes for lithium-ion batteries.

BACKGROUND

Lithium-ion batteries typically include an anode, an electrolyte, and a cathode that contains lithium in the form of a lithium-transition metal oxide. Examples of transition metal oxides that have been used include cobalt dioxide, nickel dioxide, and manganese dioxide. None of these materials, however, exhibits an optimal combination of high initial capacity, high thermal stability, and good capacity retention after repeated charge-discharge cycling.

SUMMARY

In general, the invention features a cathode composition for a lithium-ion battery having the formula $Li[M^1_{(1-x)}Mn_x]O_2$ where $0<x<1$ and $M^1$ represents one or more metal elements, with the proviso that $M^1$ is a metal element other than chromium. The composition is in the form of a single phase having an O3 crystal structure that does not undergo a phase transformation to a spinel crystal structure when incorporated in a lithium-ion battery and cycled for 100 full charge-discharge cycles at 30° C. and a final capacity of 130 mAh/g using a discharge current of 30 mA/g. The invention also features lithium-ion batteries incorporating these cathode compositions in combination with an anode and an electrolyte.

In one embodiment, $x=(2-y)/3$ and $M^1_{(1-x)}$ has the formula $Li_{(1-2y)/3}M^2_y$, where $0<y<0.5$ (preferably $0.083<y<0.5$, and more preferably $0.167<y<0.5$) and $M^2$ represent or more metal elements, with the proviso that M is a metal element other than chromium. The resulting cathode composition has the formula $Li[Li_{(1-2y)/3}M^2_yMn_{(2-y)/3}]O_2$.

In a second embodiment, $x=(2-2y)/3$ and $M^1_{(1-x)}$ has the formula $Li_{(1-y)/3}M^3_y$, where $0<y<0.5$ (preferably $0.083<y<0.5$, and more preferably $0.167<y<0.5$) and $M^3$ represents one or more metal elements, with the proviso that $M^3$ is a metal element other than chromium. The resulting cathode composition has the formula $Li[Li_{(1-y)/3}M^3_yMn_{(2-2y)/3}]O_2$.

In a third embodiment, $x=y$ and $M^1_{(1-x)}$ has the formula $M^4_yM^5_{1-2y}$, where $0<y<0.5$ (preferably $0.083<y<0.5$, and more preferably $0.167<y<0.5$), $M^4$ is a metal element other than chromium, and M is a metal element other than chromium and different from $M^4$. The resulting cathode composition has the formula $Li[M^4_yM^5_{1-2y}Mn_y]O_2$.

The invention provides cathode compositions, and lithium-ion batteries incorporating these compositions, that exhibit high initial capacities and good capacity retention after repeated charge-discharge cycling. In addition, the cathode compositions do not evolve substantial amounts of heat during elevated temperature abuse, thereby improving battery safety.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 3(a)–(e) are plots of voltage versus capacity and capacity versus cycle number for the samples described in Examples 1 and 3–6 cycled between 4.8 V and 2.0 V.

FIGS. 4(a)–(d) are x-ray diffraction patterns for the samples described in Examples 3 and 7–9.

FIGS. 5(a)–(d) are x-ray diffraction patterns for the samples described in Examples 5 and 10–12.

FIGS. 6(a)–(d) are x-ray diffraction patterns for the samples described in Examples 6 and 16–18.

FIGS. 7(a)–(d) are plots of voltage versus capacity and capacity versus cycle number for the samples described in Examples 6 and 16–18 cycled between 4.4 V and 3.0 V.

FIGS. 8(a)–(d) are plots of voltage versus capacity and capacity versus cycle number for the samples described in Examples 6 and 16–18 cycled between 4.8 V and 2.0 V.

DETAILED DESCRIPTION

Figure 1:
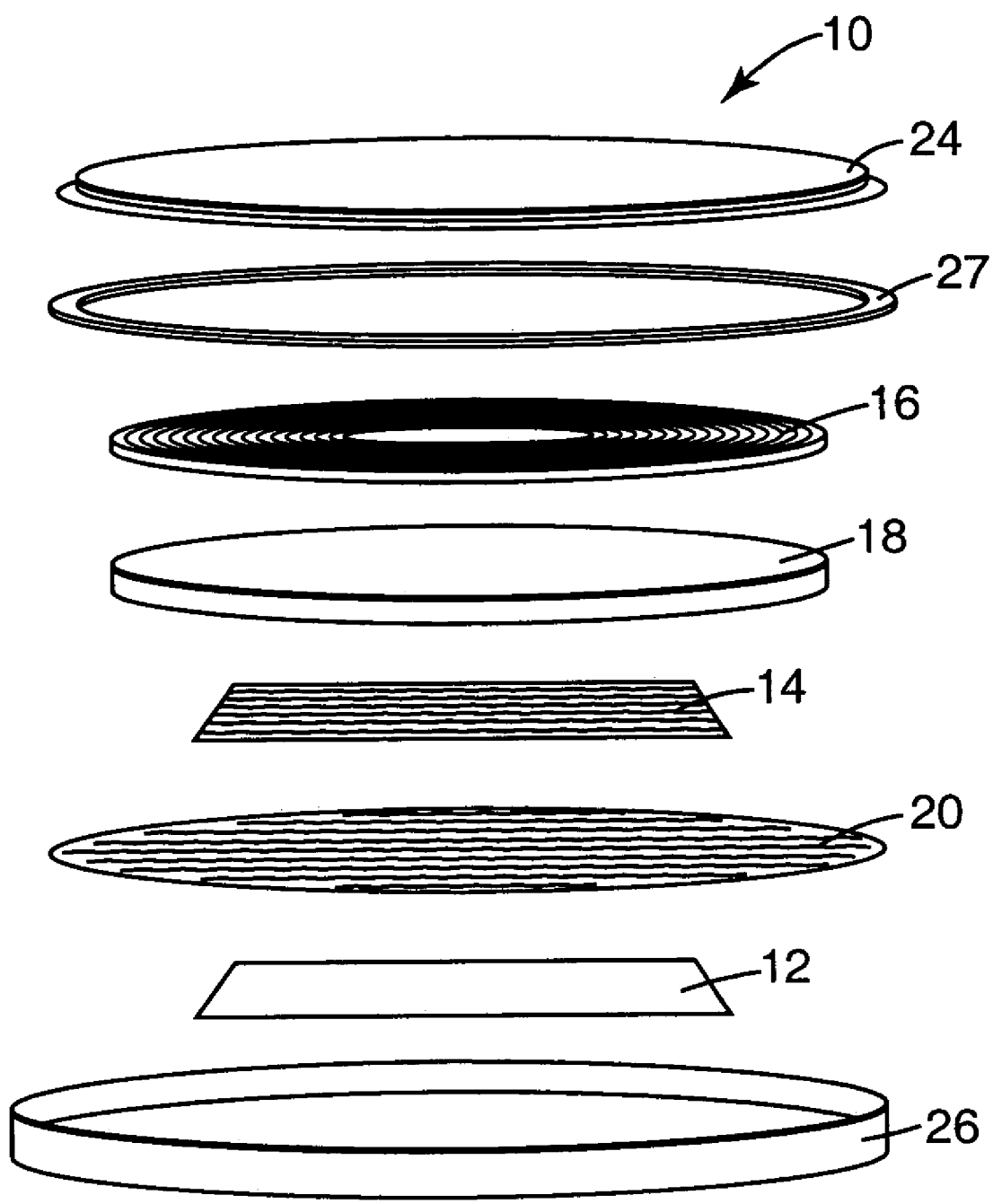
FIG. 1 is an exploded perspective view of an electrochemical cell used to test various electrode compositions.
Figure 2A:
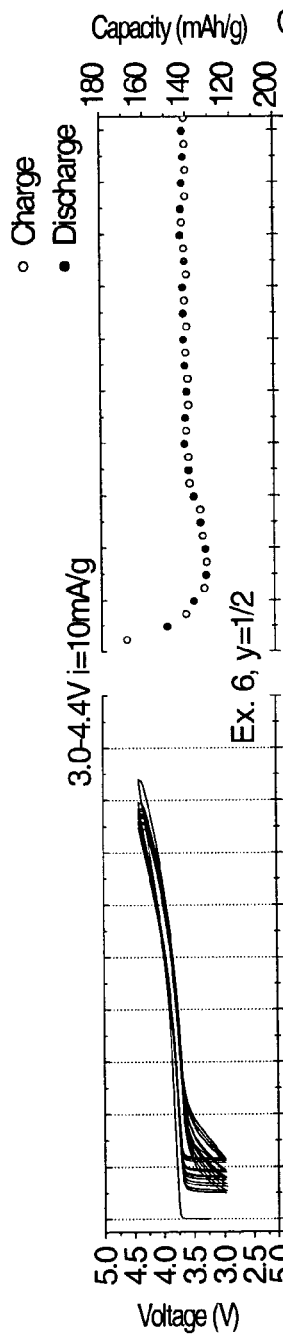
FIGS. 2(a)–(e) are plots of voltage versus capacity and capacity versus cycle number for the samples described in Examples 1 and 3–6 cycled between 4.4 V and 3.0 V.
Figure 2B:
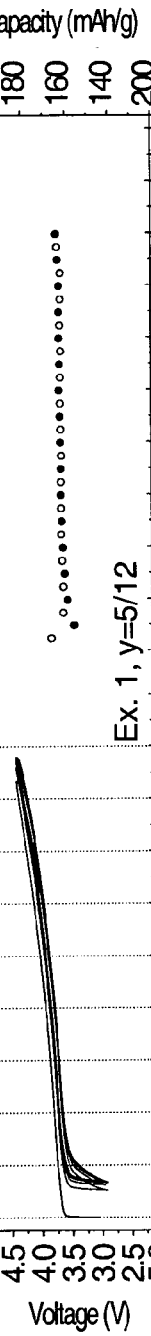
Figure 2C:
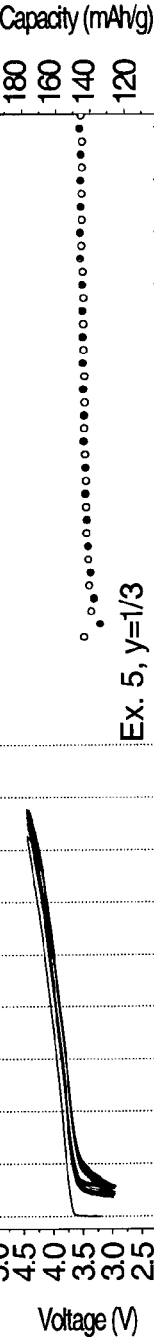
Figure 2D:
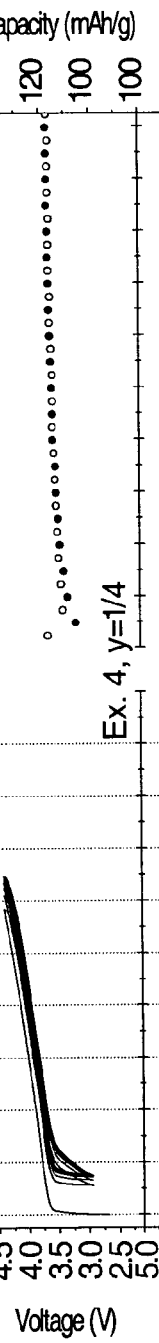
Figure 2E:
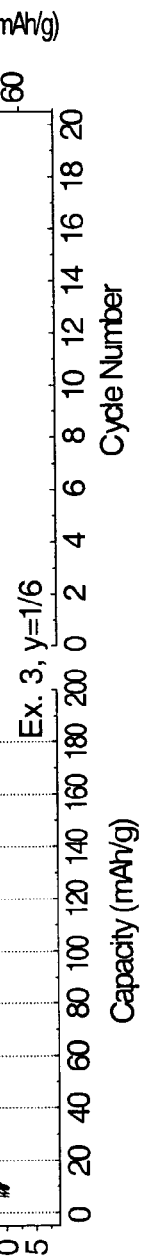

Cathode compositions have the formulae set forth in the Summary of the Invention, above. The formulae themselves, as well as the choice of particular metal elements, and combinations thereof, for $M^1$–$M^5$, reflect certain criteria that the inventors have discovered are useful for maximizing cathode performance. First, the cathode compositions preferably adopt an O3 crystal structure featuring layers generally arranged in the sequence lithium-oxygen-metal-oxygen-lithium. This crystal structure is retained when the cathode composition is incorporated in a lithium-ion battery and cycled for 100 full charge-discharge cycles at 30° C. and a final capacity of 130 mAh/g using a discharge current of 30 mA/g, rather than transforming into a spinel-type crystal structure under these conditions. In addition, to maximize rapid diffusion in the lithium layers, and thus battery performance, it is preferred to minimize the presence of metal elements in the lithium layers. It is further preferred that at least one of the metal elements be oxidizable within the electrochemical window of the electrolyte incorporated in the battery.

The cathode compositions may be synthesized by jet milling or by combining precursors of the metal elements (e.g., hydroxides, nitrates, and the like), followed by heating to generate the cathode composition. Heating is preferably conducted in air at temperatures of at least about 600° C., more preferably at least 800° C. In general, higher temperatures are preferred because they lead to materials with increased crystallinity. The ability to conduct the heating process in air is desirable because it obviates the need and associated expense of maintaining an inert atmosphere. Accordingly, the particular metal elements are selected such that they exhibit appropriate oxidation states in air at the desired synthesis temperature. Conversely, the synthesis temperature may be adjusted so that a particular metal element exists in a desired oxidation state in air at that temperature.

In general, examples of suitable metal elements for inclusion in the cathode composition include Ni, Co, Fe, Cu, Li, Zn, V, and combinations thereof. Particularly preferred cathode compositions are those having the following formulae:

$Li[Li_{(1-2y)/3}Ni_yMn_{(2-y)/3}]O_2$;

$Li[Li_{(1-y)/3}Co_yMn_{(2-2y)/3}]O_2$; and $Li[Ni_yCo_{1-2y}Mn_y]O_2$.

The cathode compositions are combined with an anode and an electrolyte to form a lithium-ion battery. Examples of suitable anodes include lithium metal, graphite, and lithium alloy compositions, e.g., of the type described in Turner, U.S. Pat. No. 6,203,944 entitled "Electrode for a Lithium Battery" and Turner, WO 00/03444 entitled "Electrode Material and Compositions." The electrolyte may be liquid or solid. Examples of solid electrolytes include polymeric electrolytes such as polyethylene oxide, polytetrafluoroethylene, fluorine-containing copolymers, and combinations thereof. Examples of liquid electrolytes include ethylene carbonate, diethyl carbonate, propylene carbonate, and combinations thereof. The electrolyte is provided with a lithium electrolyte salt. Examples of suitable salts include $LiPF_6$, $LiBF_4$, and $LiClO_4$.

The invention will now be described further by way of the following examples.

EXAMPLES

Electrochemical Cell Preparation

Electrodes were prepared as follows. About 21 wt. % active cathode material (prepared as described below), 5.3 wt. % Kynar Flex 2801 (a vinylidene fluoride-hexafluoropropylene copolymer commercially available from Atochem), 8.4 wt. % dibutyl phthalate, 2.1 wt. % Super S carbon black (commercially available from MMM Carbon, Belgium), and 63.2 wt. % acetone were mechanically shaken for 1–2 hours in a mixing vial to which a zirconia bead (8 mm diameter) had been added to form a uniform slurry. The slurry was then spread in a thin layer (about 150 micrometers thick) on a glass plate using a notch-bar spreader. After evaporating the acetone, the resulting film was peeled from the glass and a circular electrode measuring 1.3 cm in diameter was punched from the film using an electrode punch, after which the electrode was soaked in diethyl ether for about 10 minutes to remove dibutyl phthalate and to form pores in the electrode. The ether rinse was repeated two times. The electrodes were then dried at 90° C. overnight. At the conclusion of the drying period, the circular electrode was weighed and the active mass (the total weight of the circular electrode multiplied by the fraction of the electrode weight made up of the active cathode material) determined. Typically, the electrodes contained 74% by weight active material. The electrodes were then taken into an argon-filled glove box where the electrochemical cell was constructed.

An exploded perspective view of the electrochemical cell 10 is shown in FIG. 1. A stainless steel cap 24 and special oxidation resistant case 26 contain the cell and serve as the negative and positive terminals respectively. The cathode 12 was the electrode prepared as described above. The anode 14 was a lithium foil having a thickness of 125 micrometers; the anode also functioned as a reference electrode. The cell featured 2325 coin-cell hardware, equipped with a spacer plate 18 (304 stainless steel) and a disc spring 16 (mild steel). The disc spring was selected so that a pressure of about 15 bar would be applied to each of the cell electrodes when the cell was crimped closed. The separator 20 was a Celgard #2502 microporous polypropylene film (Hoechst-Celanese), which had been wetted with a 1M solution of $LiPF_6$ dissolved in a 30:70 volume mixture of ethylene carbonate and diethyl carbonate (Mitsubishi Chemical). A gasket 27 was used as a seal and to separate the two terminals.

Elemental Analysis

Approximately 0.02 g of each sample was accurately weighed on a microbalance (to 1 μg) into a 50 mL glass class A volumetric flask. 2 mL hydrochloric acid and 1 mL nitric acid were then added to form a salt. Once the salt had dissolved, the solution was diluted to 50 mL with deionized water and the solution shaken to mix. This solution was diluted further 10 times. Next, a 5 mL aliquot was removed with a glass class A volumetric pipet and diluted to 50 mL in a glass class A volumetric flask with 4% HCl and 2% nitric acid.

The diluted solution were analyzed on a Jarrell-Ash 61E ICP using standards of 0, 1, 3, 10, and 20 ppm Co, Ni, Mn, Li, and Na in 4% HCl/2% HNO3. A 5 ppm standard of each element was used to monitor the stability of the calibration. All standards were prepared from a certified stock solution and with class A volumetric glassware. Prior to analysis of the elements, the injector tube of the ICP was cleaned to remove any deposits. All element calibration curves exhibited $r_2$ values in excess of 0.9999.

The analytical results were measured in weight percent. These values were then converted to atomic percent and then ultimately to a stoichiometry where the oxygen content had been normalized to a stoichiometry of 2.

Examples 1–6

Example 1 describes the synthesis of 0.1 mole of $Li[Li_{(1-2y)/3}Ni_yMn_{(2-y)/3}]O_2$ where y=0.416.

12.223 g of $Ni(NO_3)_2 \cdot 6H_2O$ (Aldrich Chemical Co.) and 13.307 g of $Mn(NO_3)_2 \cdot 4H_2O$ (Aldrich Chemical Co.) were dissolved in 30 mls of distilled water to form a transition metal solution. In a separate beaker, 9.575 g of $LiOH \cdot H_2O$ (FMC Corp.) was dissolved in 200 mls of distilled water. While stirring, the transition metal solution was added dropwise using a buret to the lithium hydroxide solution over a period of about 3 hours. This caused the co-precipitation of a Ni—Mn hydroxide and the formation of $LiNO_3$ (dissolved). The precipitate was recovered by filtration and washed repeatedly using vacuum filtration. It was then placed in a box furnace set to 180° C. to dry, after which it was mixed with 4.445 g $LiOH \cdot H_2O$ in an autogrinder and pressed into a number of pellets, each weighing two grams.

The pellets were heated in air at 480° C. for 3 hours, after which they were quenched to room temperature, combined, and re-ground into powder. New pellets were pressed and heated in air to 900° C. for 3 hours. At the conclusion of the heating step, the pellets were quenched to room temperature and again ground to powder to yield the cathode material.

Elemental analysis of the cathode material revealed that the composition had the following stoichiometry: Li[Li$_{0.06}$Ni$_{0.393}$Mn$_{0.51}$]O$_2$, which is in close agreement with the target stoichiometry of Li[Li$_{0.06}$Ni$_{0.42}$Mn$_{0.53}$]O$_2$.

Examples 2–6 were prepared in analogous fashion except that the relative amounts of reactants were adjusted to yield samples in which y=0.083 (Example 2), 0.166 (Example 3), 0.25 (Example 4), 0.333 (Example 5), and 0.5 (Example 6). Elemental analysis of the cathode material from Example 5 revealed that the composition had the following stoichiometry: Li[Li$_{0.13}$Ni$_{0.314}$Mn$_{0.55}$]O$_2$, which is in close agreement with the target stoichiometry of Li [Li$_{0.11}$Ni$_{0.33}$Mn$_{0.56}$]O$_2$.

A powder x-ray diffraction pattern for each sample was collected using a Siemens D5000 diffractometer equipped with a copper target X-ray tube and a diffracted beam monochromator. Data was collected between scattering angles of 10 degrees and 130 degrees.

The crystal structure of each sample was determined based upon the x-ray diffraction data as described in (a) C. J. Howard and R. J. Hill, Australian Atomic Energy Commission Report No. M112 (1986); and (b) D. B. Wiles and R. A. Young, J. Appl. Cryst., 14:149–151 (1981). Lattice parameters were determined using the Rietveld refinement. The lattice parameters for each sample are reported in Table 1. The crystal structure of each sample could be described well by the O3 crystal structure type.

Electrochemical cells were constructed according to the above-described procedure using the material of Examples 1 and 3–6 as the cathode. Each cell was charged and discharged between 4.4 V and 3.0 V at 30° C. using computer-controlled discharge stations from Moli Energy Ltd. (Maple Ridge, B.C., Canada) and a current of 10 mA/g of active material. FIG. 3 is a plot of voltage versus capacity and capacity versus cycle number for each cell. Reversible and irreversible capacities were determined and are reported in Table 1. Each sample showed excellent reversibility and excellent capacity retention for at least 15 cycles.

A second set of electrochemical cells was constructed using the materials of Examples 1 and 3–6, and cycled as described above with the exception that the cells were charged and discharged between 4.8 V and 2.0 V using a current of 5 mA/g of active material. FIG. 3 is a plot of voltage versus capacity and capacity versus cycle number for each cell. Reversible and irreversible capacities were determined and are reported in Table 1. Each sample performed well. Examples 3 and 4 show large irreversible capacities, but still give stable reversible capacities over 200 mAh/g. Samples 1, 5, and 6 show irreversible capacities less than 30 mAh/g and reversible capacities greater than 200 mAh/g. In particular, Example 1 shows an irreversible capacity of only about 15 mAh/g and a reversible capacity of about 230 mAh/g.

TABLE 1

| Example | y | HTT (° C.) | a (Å) | c (Å) | Rev. Capacity mAh/g 3.0–4.4 V | Irrev. Capacity mAh/g 3.0–4.4 V | Rev. Capacity mAh/g 2.0–4.8 V | Irrev. Capacity mAh/g 2.0–4.8 V |
|---|---|---|---|---|---|---|---|---|
| 1 | 0.416 | 900 | 2.8793 | 14.2871 | 160 | 10 | 230 | 15 |
| 2 | 0.083 | 900 | 2.8499 | 14.2386 | * | * | * | * |
| 3 | 0.166 | 900 | 2.8589 | 14.2427 | 82 | 10 | 230 | 120 |
| 4 | 0.25 | 900 | 2.8673 | 14.258 | 117 | 12 | 250 | 50 |
| 5 | 0.333 | 900 | 2.8697 | 14.2654 | 142 | 10 | 240 | 25 |
| 6 | 0.5 | 900 | 2.8900 | 14.2971 | 140 | 10 | 200 | 25 |

"HTT" refers to the heat treatment temperature.
"a" and "c" represent lattice parameters.
An asterisk means "not tested."

Figure 12:
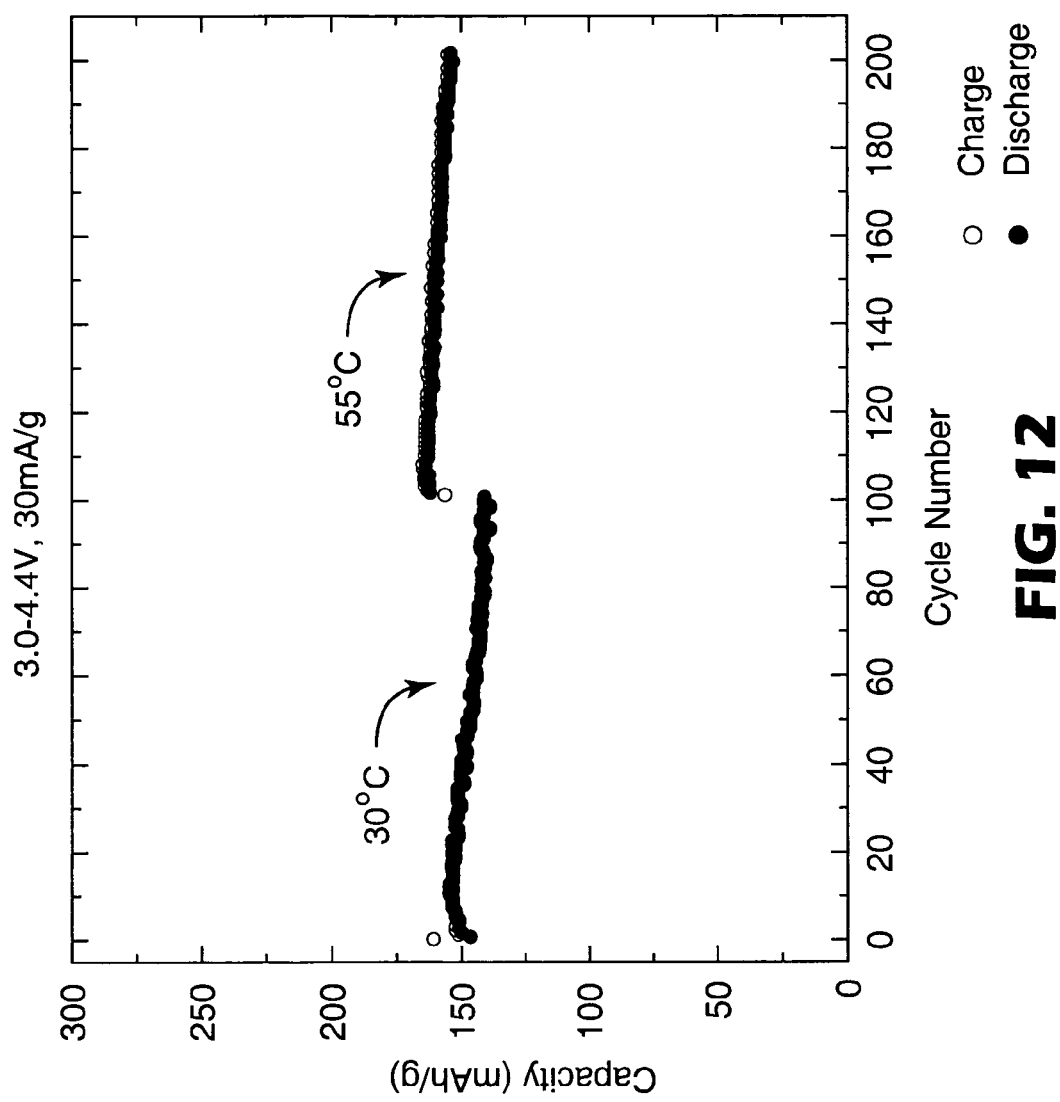
FIG. 12 is a plot of capacity versus cycle number for the sample described in Example 1 cycled between 4.4 V and 3.0 V at both 30° C. and 55° C.

Another electrochemical cell was assembled using the material of Example 1 and cycled between 3.0 V and 4.4 V using a current of 30 mA/g. Some cycles were collected at 30° C., while other cycles were collected at 55° C. The results are reported in FIG. 12. The capacity of the material was maintained even at 55° C. after extended cycling, demonstrating that the material did not exhibit phase separation after extended cycling.

Figure 13:
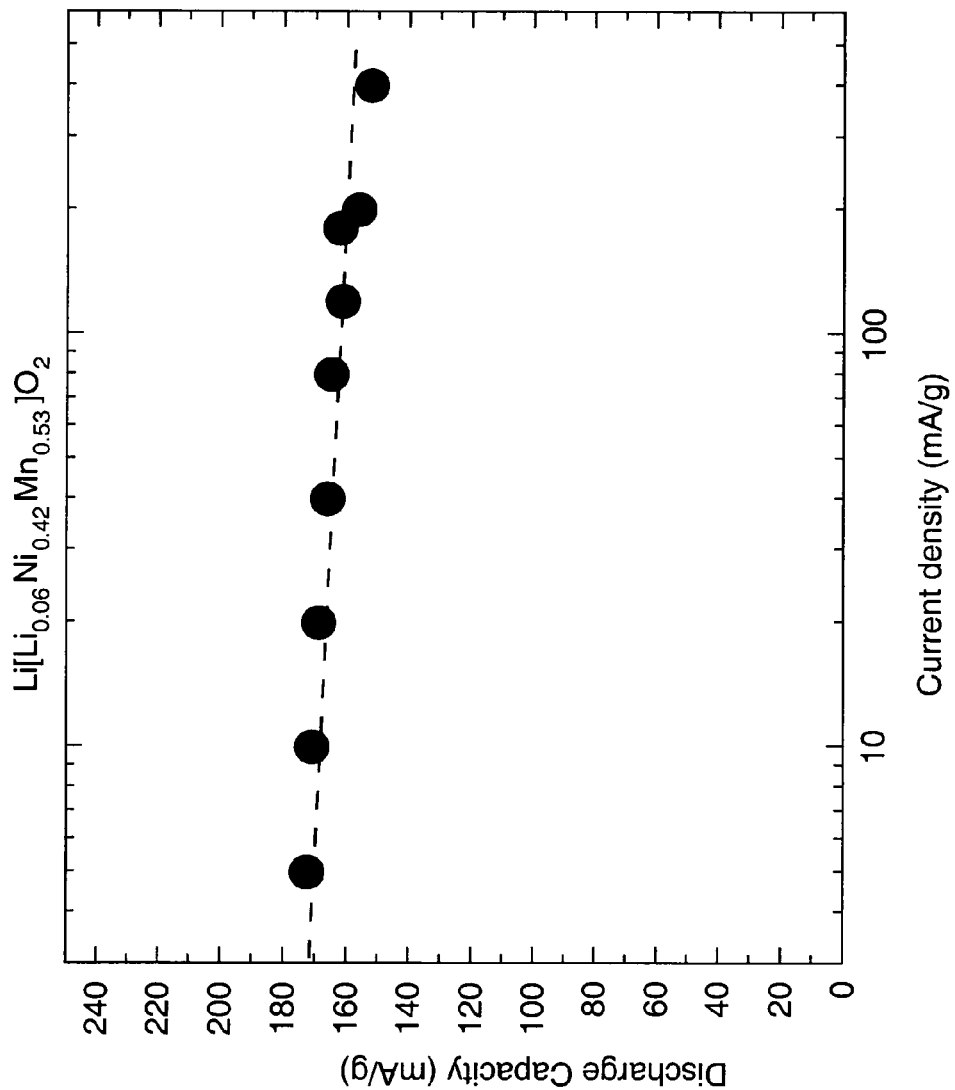
FIG. 13 is a plot of capacity versus discharge current density for the sample described in Example 1 measured at 30° C. to a 2.5 V cutoff.

Another electrochemical cell was assembled using the material of Example 1 and used to test the rate capability of the material. Data was collected at 30° C. up to a 2.0 V cutoff. The results are shown in FIG. 13. The results demonstrate that the capacity of the material was maintained even up to discharge currents as large as 400 mA/g.

Examples 7–9

Examples 7–9 were prepared following the procedure described for Examples 1–6 where y=0.166 except that the samples were heated at 600° C. (Example 7), 700° C. (Example 8), and 800° C. (Example 9), rather than 900° C. X-ray diffraction patterns for each sample were collected and are shown in FIG. 3, along with an x-ray diffraction pattern for Example 3 prepared at 900° C. The lattice parameters were also determined and are set forth in Table 2, along with the data for Example 3. The data demonstrate that as the heating temperature increases, the peak widths in the diffraction patterns become narrower, indicating increased crystallinity. All peaks can be understood based on the O3 crystal structure.

TABLE 2

| Example | y | HTT (° C.) | a (Å) | c (Å) |
|---|---|---|---|---|
| 7 | 0.166 | 600 | 2.8653 | 14.1739 |
| 8 | 0.166 | 700 | 2.8614 | 14.2076 |
| 9 | 0.166 | 800 | 2.8597 | 14.2289 |
| 3 | 0.166 | 900 | 2.8589 | 14.2427 |

"HTT" refers to the heat treatment temperature.
"a" and "c" represent lattice parameters.

Examples 10–12

Examples 10–12 were prepared following the procedure described for Examples 1—6 where y=0.333 except that the samples were heated at 600° C. (Example 10), 700° C. (Example 11), and 800° C. (Example 12), rather than 900° C. X-ray diffraction patterns for each sample were collected and are shown in FIG. 4, along with an x-ray diffraction pattern for Example 5 prepared at 900° C. The lattice parameters were also determined and are set forth in Table 3, along with the data for Example 5. The data demonstrate that as the heating temperature increases, the peak widths in the diffraction patterns become narrower, indicating increased crystallinity. All peaks can be understood based on the O3 crystal structure.

Electrochemical cells were constructed using material from Examples 10 and 12 as the cathode, as cycled as described above. The reversible and irreversible capacities are also reported in Table 3, along with data for Example 5. All samples performed well.

TABLE 3

| Example | y | HTT (° C.) | a (Å) | c (Å) | Rev. Capacity mAh/g 3.0–4.4 V | Irrev. Capacity mAh/g 3.0–4.4 V | Rev. Capacity mAh/g 2.0–4.8 V | Irrev. Capacity mAh/g 2.0–4.8 V |
|---|---|---|---|---|---|---|---|---|
| 10 | 0.333 | 600 | 2.8800 | 14.2389 | 110 | 50 | 210 | 65 |
| 11 | 0.333 | 700 | 2.8761 | 14.2569 | * | * | * | * |
| 12 | 0.333 | 800 | 2.8714 | 14.2644 | 120 | 20 | 230 | 50 |
| 5 | 0.333 | 900 | 2.8697 | 14.2654 | 160 | 10 | 230 | 15 |

"HTT" refers to the heat treatment temperature.
"a" and "c" represent lattice parameters.
An asterisk means "not tested."

Examples 13–15

Examples 13–15 were prepared following the procedure described for Examples 1–6 where y=0.416 except that the samples were heated at 600° C. (Example 13), 700° C. (Example 14), and 800° C. (Example 15), rather than 900° C. The lattice parameters were determined for each sample and are set forth in Table 4, along with the data for Example 1 (y=0.416, 900° C.). These samples also exhibited the O3 crystal structure.

TABLE 4

| Example | y | HTT (° C.) | a (Å) | c (Å) |
|---|---|---|---|---|
| 13 | 0.416 | 600 | 2.8829 | 14.2609 |
| 14 | 0.416 | 700 | 2.8824 | 14.2720 |
| 15 | 0.416 | 800 | 2.8824 | 14.2808 |
| 1 | 0.416 | 900 | 2.8793 | 14.2781 |

"HTT" refers to the heat treatment temperature.
"a" and "c" represent lattice parameters.

Examples 16–18

Examples 16–18 were prepared following the procedure described for Examples 1–6 where y=0.5 except that the samples were heated at 600° C. (Example 16), 700° C. (Example 17), and 800° C. (Example 18), rather than 900° C. X-ray diffraction patterns for each sample were collected and are shown in FIG. 6, along with an x-ray diffraction pattern for Example 6 prepared at 900° C. The lattice parameters were also determined and are set forth in Table 5, along with the data for Example 6. The data demonstrate that as the heating temperature increases, the peak widths in the diffraction patterns become narrower, indicating increased crystallinity. All peaks can be understood based on the O3 crystal structure.

Electrochemical cells were constructed using material from Examples 16–18 as the cathode, as cycled as described above. The reversible and irreversible capacities are also reported in Table 5, along with data for Example 6. In addition, FIG. 7 reports voltage versus capacity and capacity versus cycle number for each cell, as well as a cell constructed using Example 6, when cycled between 4.4 V and 3.0 V. FIG. 8 reports voltage versus capacity and capacity versus cycle number for each cell, as well as a cell constructed using Example 6, when cycled between 4.8 V and 2.0 V. All samples performed well, with samples prepared at higher temperatures exhibiting the best capacity retention and lowest irreversible capacity.

TABLE 5

| Example | y | HTT (° C.) | a (Å) | c (Å) | Rev. Capacity mAh/g 3.0–4.4 V | Irrev. Capacity mAh/g 3.0–4.4 V | Rev. Capacity mAh/g 2.0–4.8 V | Irrev. Capacity mAh/g 2.0–4.8 V |
|---|---|---|---|---|---|---|---|---|
| 16 | 0.5 | 600 | 2.8926 | 14.298 | 120 | 60 | 200 | 50 |
| 17 | 0.5 | 700 | 2.8914 | 14.2842 | 140 | 20 | 210 | 25 |

TABLE 5-continued

| Example | y | HTT (° C.) | a (Å) | c (Å) | Rev. Capacity mAh/g 3.0–4.4 V | Irrev. Capacity mAh/g 3.0–4.4 V | Rev. Capacity mAh/g 2.0–4.8 V | Irrev. Capacity mAh/g 2.0–4.8 V |
|---|---|---|---|---|---|---|---|---|
| 18 | 0.5 | 800 | 2.8889 | 14.2812 | 145 | 15 | 210 | 20 |
| 6 | 0.5 | 900 | 2.8899 | 14.2964 | 140 | 10 | 200 | 25 |

"HTT" refers to the heat treatment temperature.
"a" and "c" represent lattice parameters.

Examples 19–20

Example 19 describes the preparation of 0.1 mole of Li[Ni$_x$Co$_{1-2y}$Mn$_y$]O$_2$ where y=0.375. The procedure described in Examples 1–6 was followed except that the following reactants were used: 10.918 g of Ni(NO$_3$)$_2$·6H$_2$O, 9.420 g of Mn(NO$_3$)$_2$·4H$_2$O, and g of Co(NO$_3$)$_2$·6H$_2$O. In addition, the dried transition metal hydroxide was mixed with 4.195 g of LiOH·H$_2$O. The lattice parameters were measured and determined to be: a=2.870 Å and c=14.263 Å. Elemental analysis of the material revealed that the composition had the following stoichiometry: Li$_{1.04}$[Ni$_{0.36}$Co$_{0.263}$Mn$_{0.38}$]O$_2$, which is in close agreement with the target stoichiometry of Li [Ni$_{0.375}$Co$_{0.25}$Mn$_{0.375}$]O$_2$.

Example 20 was prepared in similar fashion except that the relative amounts of ingredients were adjusted to yield y=0.25. The lattice parameters were measured and determined to be: a=2.8508 and c=14.206 Å. Elemental analysis of the material revealed that the composition had the following stoichiometry: Li$_{1.03}$[Ni$_{0.243}$Co$_{0.517}$Mn$_{0.25}$]O$_2$, which is in close agreement with the target stoichiometry of Li [Ni$_{0.25}$Co$_{0.5}$Mn$_{0.25}$]O$_2$.

Figure 9A:
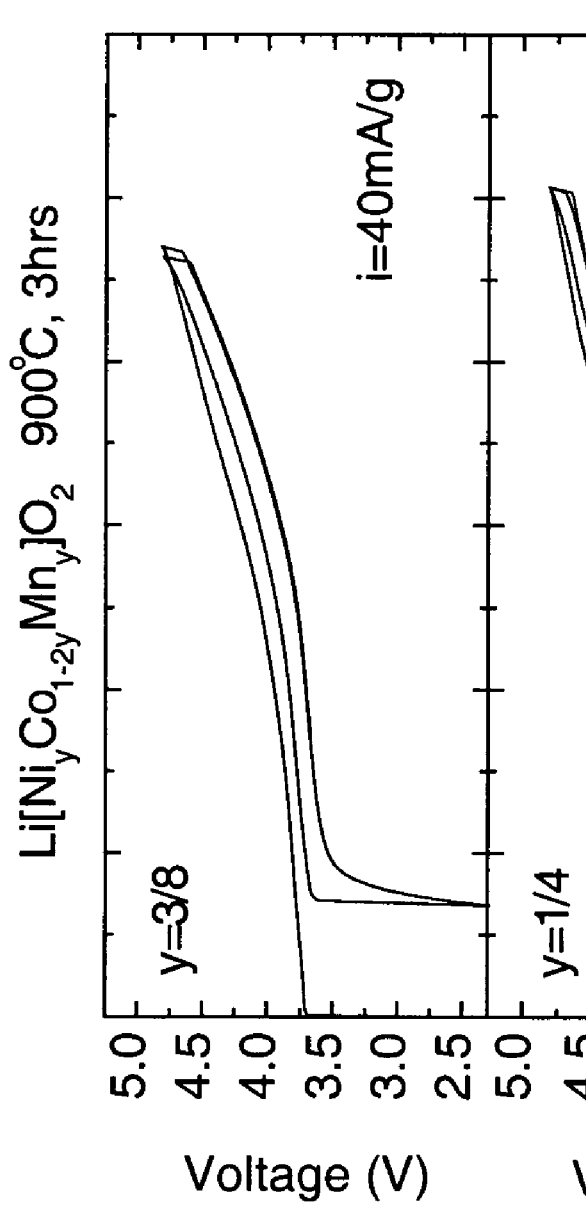
FIGS. 9(a)–(b) are plots of voltage versus capacity for the samples described in Examples 19 and 20.
Figure 9B:
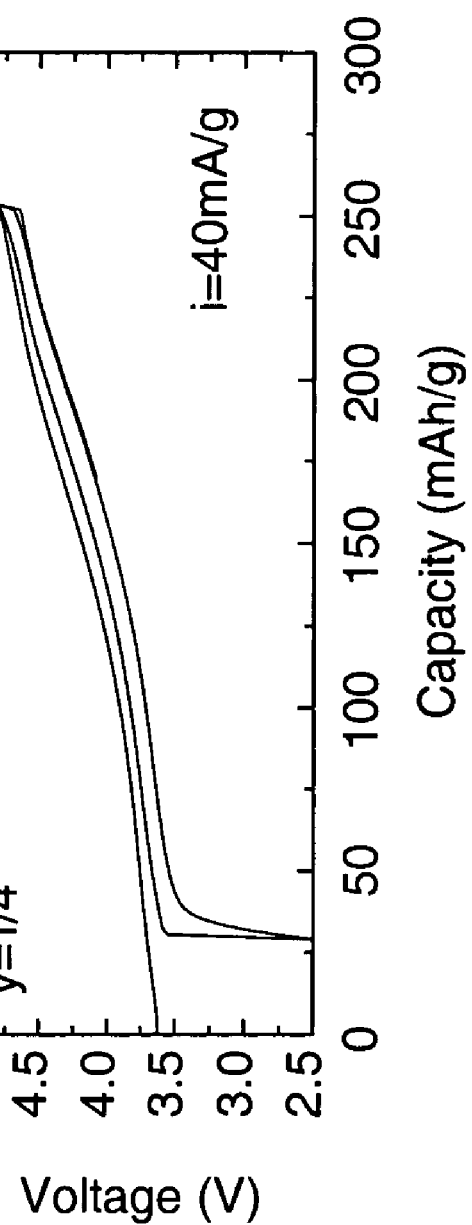

Electrochemical cells were constructed using material from Examples 19–20 as the cathode, as cycled as described above. FIG. 9 reports voltage versus capacity for each cell when cycled between 2.5 V and 4.8 V. Both samples performed well.

Figure 10:
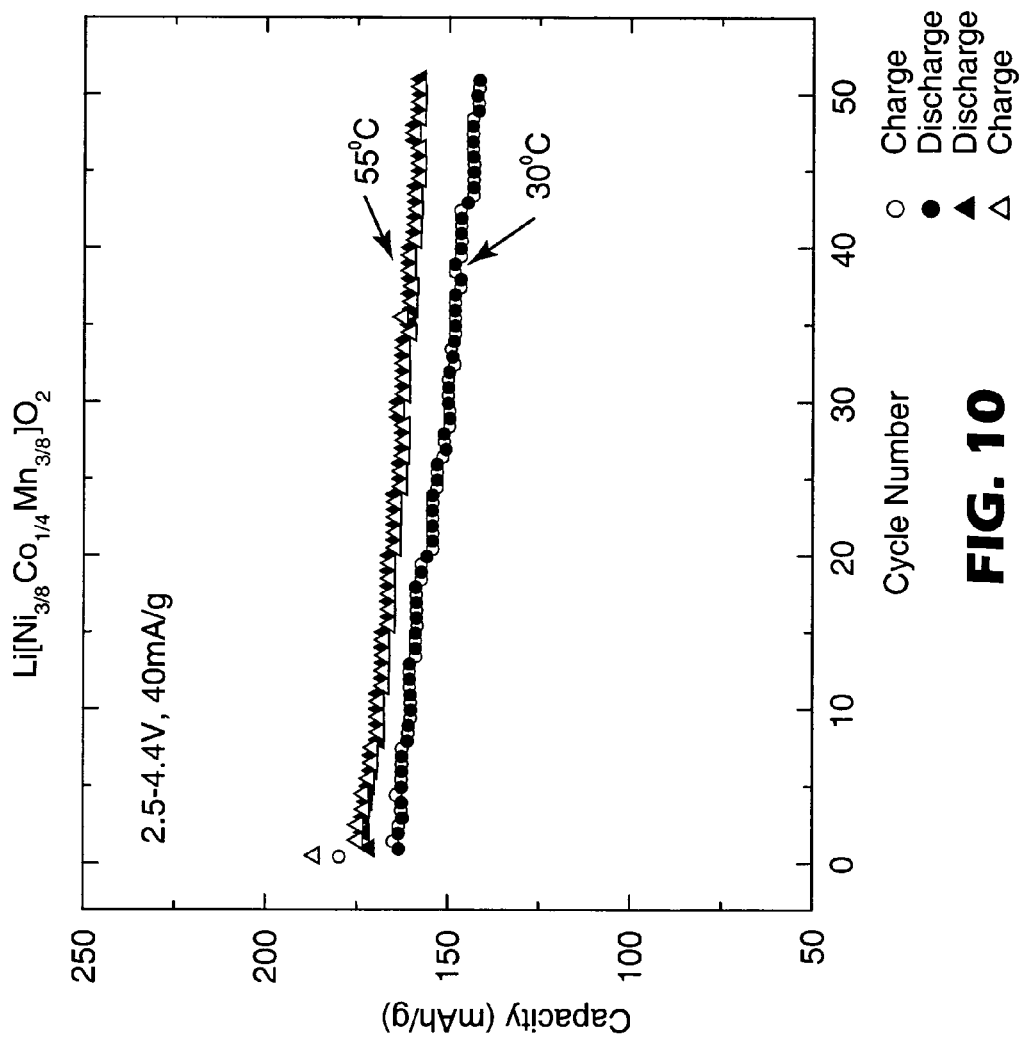
FIG. 10 is a plot of capacity versus cycle number for the sample described in Example 19 cycled between 4.4V and 2.5 V.
Figure 11:
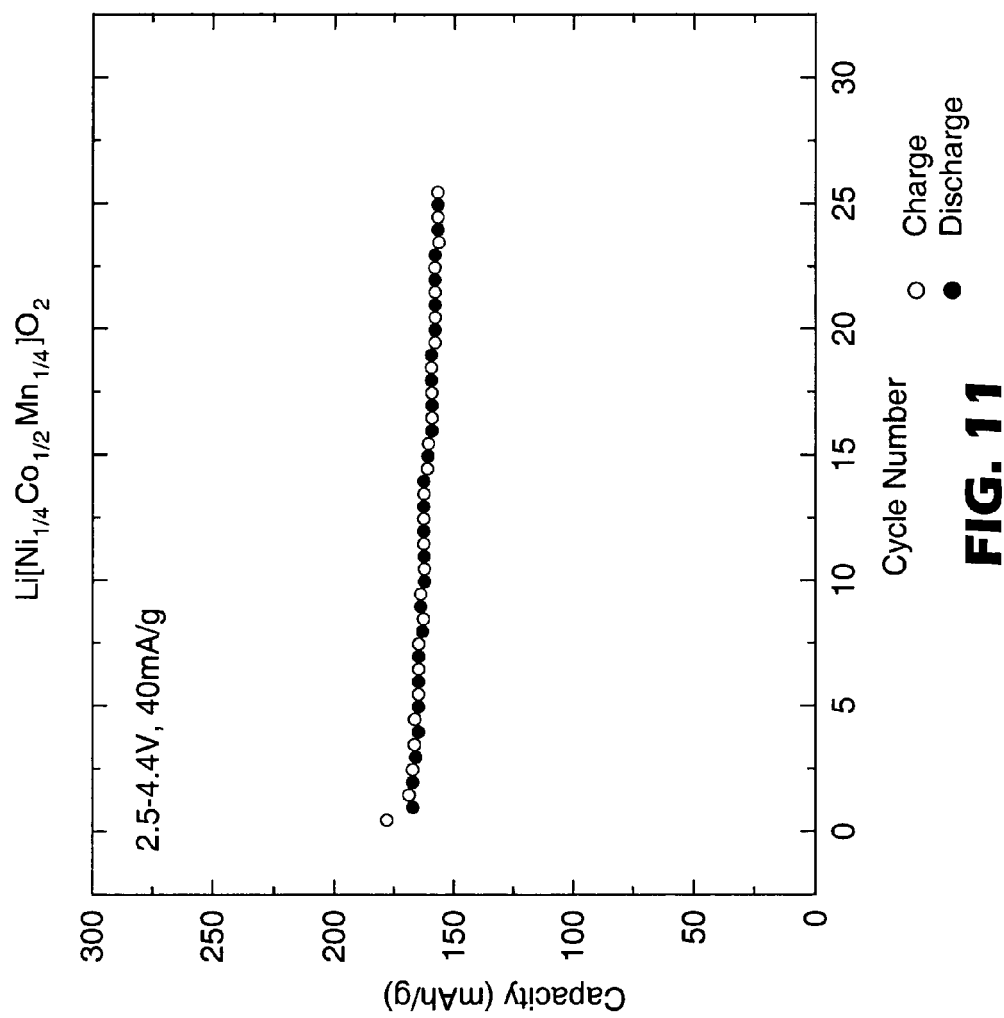
FIG. 11 is a plot of capacity versus cycle number for the sample described in Example 20 cycled between 4.4 V and 2.5 V.

A second set of electrochemical cells was constructed using material from Examples 19–20 and cycled as described above between 2.5 V and 4.4 V using a current of 40 mA/g. The results are shown in FIGS. 10 and 11. In the case of Example 19 (FIG. 10), data was collected at both 30° C. and 55° C., whereas in the case of Example 20 (FIG. 11) data was collected at 30° C. only. Both samples performed well.

The cathode material from Example 19 was further analyzed using differential scanning calorimetry (DSC). The sample cell was a 3.14 mm outer diameter, type 304 stainless steel seamless tube having a wall thickness of 0.015 mm that had been cut into an 8.8 mm long piece (MicroGroup, Medway, Mass.). The cell was cleaned, after which one end was flattened. The flattened end was then welded shut by tungsten inert gas welding using a Miller Maxstar 91 ARC welder equipped with a Snap Start II high frequency ARC starter.

Once the flattened end had been sealed, the tube was loaded in an argon-filled glove box with 2 mg of the cathode material from Example 19 taken from a 2325 coin cell that had been charged to 4.2 V using the procedure described above. The electrolyte was not removed from the cathode sample. After the sample was loaded, the tube was crimped and welded shut.

The DSC measurements were performed using a TA Instruments DSC 910 instrument. The DSC sweep rate was 2° C./minute. Both the onset temperature and the total heat evolved were recorded. The onset temperature corresponds to the temperature at which the first major exothermic peak occurs. The results are shown in Table 6. For the sake of comparison, data from cathodes prepared using LiNiO$_2$ and LiCoO$_2$ is included as well. The results demonstrate that cathodes prepared using the material from Example 19 exhibited a higher onset temperature and evolved less heat than cathodes prepared using LiNiO$_2$ and LiCoO$_2$.

TABLE 6

| Material | Onset Temperature (° C.) | Total Heat (J/g) |
|---|---|---|
| Example 19 | 290 | 404 |
| LiNiO$_2$ | 180 | 1369 |
| LiCoO$_2$ | 185 | 701 |

A number of embodiments of the invention have been described. Nevertheless, it will be understood that various modifications may be made without departing from the spirit and scope of the invention. Accordingly, other embodiments are within the scope of the following claims.

What is claimed is:

1. A cathode composition for a lithium-ion battery in which the cathode composition has the formula Li[Li$_{(1-2y)/3}$M$^2_y$Mn$_{(2-y)/3}$]O$_2$,
   where 0.083<y<0.5 and M$^2$ represents one or more metal elements, with the proviso that M$^2$ is a metal element other than chromium,
   said composition characterized as being in the form of a single phase having an O3 crystal structure that does not undergo a phase transformation to a spinel crystal structure when incorporated in a lithium-ion battery and cycled for 100 full charge-discharge cycles at 30° C. and a final capacity of 130 mAh/g using a discharge current of 30 mA/g.

2. A cathode composition according to claim 1 wherein 0.167<y<0.5.

3. A cathode composition according to claim 1 wherein M$^2$ is selected from the group consisting of Ni, Co, Fe, Cu, Li, Zn, V, and combinations thereof.

4. A cathode composition according to claim 1 wherein M$^2$ includes Ni.

5. A cathode composition according to claim 1 wherein M$^2$ includes Co.

6. A cathode composition according to claim 1 wherein M$^2$ includes the combination of Ni and Co.

7. A cathode composition for a lithium-ion battery in which the cathode composition has the formula Li[Li$_{(1-y)/3}$M$^3_y$Mn$_{(2-2y)/3}$]O$_2$,
   where 0.083<y<0.5 and M$^3$ represents one or more metal elements, with the proviso that M$^3$ is a metal element other than chromium, and includes the combination of Ni and Co, said composition characterized as being in the form of a single phase having an O3 crystal structure that does not undergo a phase transformation to a spinel crystal structure when incorporated in a lithium-ion battery and cycled for 100 full charge-discharge cycles at 30° C. and a final capacity of 130 mAh/g using a discharge current of 30 mA/g.

8. A cathode composition according to claim 7 wherein $0.167 < y < 0.5$.

9. A cathode composition according to claim 7 wherein $M^3$ further includes an element selected from the group consisting of Fe, Cu, Li, Zn, V, and combinations thereof.

10. A cathode composition for a lithium-ion battery in which the cathode composition has the formula $Li[M^4_y M^5_{1-2y} Mn_y]O_2$, where $0.083 < y < 0.5$ and:
(a) $M^4$ is Co and $M^5$ includes the combination of Li and Ni or
(b) $M^4$ is Li and $M^5$ includes the combination of Ni and Co, with the proviso that $M^4$ and $M^5$ do not include chromium, said composition characterized as being in the form of a single phase having an O3 crystal structure that does not undergo a phase transformation to a spinel crystal structure when incorporated in a lithium-ion battery and cycled for 100 full charge-discharge cycles at 30° C. and a final capacity of 130 mAh/g using a discharge current of 30 mA/g.

11. A cathode composition according to claim 10 wherein $0.167 < y < 0.5$.

12. A cathode composition according to claim 10 wherein $M^5$ further includes an element selected from the group consisting of Fe, Cu, Li, Zn, V, and combinations thereof.

13. A cathode composition according to claim 10 wherein $M^4$ is Li and $M^5$ includes the combination of Ni and Co.

14. A cathode composition according to claim 10 wherein $M^4$ is Co and $M^5$ includes the combination of Li and Ni.

15. A cathode composition for a lithium-ion battery in which the cathode composition has the formula $Li[Ni_y Co_{1-2y} Mn_y]O_2$, where $0.083 < y < 0.5$, said composition characterized as being in the form of a single phase having an O3 crystal structure that does not undergo a phase transformation to a spinel crystal structure when incorporated in a lithium-ion battery and cycled for 100 full charge-discharge cycles at 30° C. and a final capacity of 130 mAh/g using a discharge current of 30 mA/g.

16. A cathode composition according to claim 15 wherein $0.167 < y < 0.5$.

17. A cathode composition for a lithium-ion battery in which the cathode composition has the formula $Li[M^1_{(1-x)} Mn_x]O_2$ where $0 < x < 1$ and $M^1$ represents one or more metal elements, with the proviso that (i) $M^1$ is a metal element other than chromium, (ii) $M^1$ includes the combination of Ni and Li, and (iii) the stoichiometry of the formula is selected such that $(Li-1)/(Mn-Ni)=0.5$, said composition characterized as being in the form of a single phase having an O3 crystal structure that does not undergo a phase transformation to a spinel crystal structure when incorporated in a lithium-ion battery and cycled for 100 full charge-discharge cycles at 30° C. and a final capacity of 130 mAh/g using a discharge current of 30 mA/g.

18. A cathode composition according to claim 17 wherein $M^1$ further includes an element selected from the group consisting of Co, Fe, Cu, Zn, V, and combinations thereof.

19. A cathode composition according to claim 17 wherein $M^1$ further includes Co.

20. A cathode composition according to claim 17 wherein $0.083 < x < 0.5$.

21. A cathode composition according to claim 17 wherein $0.167 < x < 0.5$.

22. A lithium-ion battery comprising:
(a) an anode;
(b) a cathode comprising a composition according to claim 1, 7, 10, 15, or 16; and
(c) an electrolyte separating said anode and said cathode.

* * * * *

UNITED STATES PATENT AND TRADEMARK OFFICE
CERTIFICATE OF CORRECTION

PATENT NO. : 7,078,128 B2
APPLICATION NO. : 11/052323
DATED : July 18, 2006
INVENTOR(S) : Zhonghua Lu It is certified that error appears in the above-identified patent and that said Letters Patent is hereby corrected as shown below:

Title Page 1, (56) References Cited, U.S. Patent Documents, Second Column
After "2002/0086210 A1" delete "11/2001" and insert --7/2002--
Delete "2003/3082452" and insert --2003/0082452--

Title Page 2, Other Publications Col. 2
Line 9 Dahn et al., lines 1-2, delete "$Li_2Cr_2Mn_{2-x}O_4$" and insert --$Li_2Cr_xMn_{2-x}O_4$--
Line 12 Delmas et al., line 1, delete "$A_2MO_2$" and insert --$A_xMO_2$--
Line 2 Paulsen and Dahn, line 2, delete "Recharageable" and insert --Rechargeable--

Column 1
Lines 29-30, delete "Li [M$_{1-x)}$Mn$_x$]O$_2$" and insert --$Li[M^1_{(1-x)}Mn_x]O_2$--

Line 43, delete "represent" and insert --represents one--
Line 44, delete "M" and insert --$M^2$--
Line 58, delete "M" and insert --$M^5$--

Column 4
Line 44, delete "$r_2$" and insert --$r^2$--

Column 9
Line 19, delete "g" and insert --7.280 g--
Lines 24-25, delete "$Li_{1.04}[Ni_{0.36}CO_{0.263}Mn_{0.38}]O_2$" and insert
--$Li_{1.04}[Ni_{0.368}Co_{0.263}Mn_{0.38}]O_2$--
Line 26, delete "$Li[Ni_{0.375}CO_{0.25}MN_{0.375}]O_2$" and insert --$Li[Ni_{0.375}Co_{0.25}Mn_{0.375}]O_2$--

Column 12
Lines 12-13, delete "Li [M$_{(1-x)}$Mn$_x$]O$_2$" and insert --$Li[M^1_{(1-x)}Mn_x]O_2$--

Signed and Sealed this

Ninth Day of January, 2007

JON W. DUDAS
*Director of the United States Patent and Trademark Office*

(12) EX PARTE REEXAMINATION CERTIFICATE (9500th)

United States Patent
Lu et al.

(10) Number: US 7,078,128 C1
(45) Certificate Issued: *Jan. 30, 2013

(54) CATHODE COMPOSITIONS FOR LITHIUM-ION BATTERIES

(75) Inventors: Zhonghua Lu, Halifax (CA); Jeffrey R. Dahn, Hubley (CA)

(73) Assignee: 3M Innovative Properties Company, St. Paul, MN (US)

Reexamination Request:
No. 90/011,816, Jul. 29, 2011

Reexamination Certificate for:
Patent No.: 7,078,128
Issued: Jul. 18, 2006
Appl. No.: 11/052,323
Filed: Feb. 7, 2005

Certificate of Correction issued Jan. 9, 2007.

( * ) Notice: This patent is subject to a terminal disclaimer.

Related U.S. Application Data

(63) Continuation of application No. 09/845,178, filed on Apr. 27, 2001, now Pat. No. 6,964,828.

(51) Int. Cl.
*C01G 45/00* (2006.01)
*C01G 51/00* (2006.01)
*C01G 53/00* (2006.01)
*H01M 4/48* (2010.01)
*H01M 4/50* (2010.01)
*H01M 4/52* (2010.01)
*H01M 10/36* (2010.01)

(52) U.S. Cl. .................. 429/231.95; 252/182.1; 429/224

(58) Field of Classification Search ........................ None
See application file for complete search history.

(56) References Cited

To view the complete listing of prior art documents cited during the proceeding for Reexamination Control Number 90/011,816, please refer to the USPTO's public Patent Application Information Retrieval (PAIR) system under the Display References tab.

*Primary Examiner* — Sean E Vincent

(57) ABSTRACT

A cathode composition for a lithium-ion battery having the formula $Li[M^1_{(1-x)}Mn_x]O_2$ where $0 < x < 1$ and $M^1$ represents one or more metal elements, with the proviso that $M^1$ is a metal element other than chromium. The composition is in the form of a single phase having an O3 crystal structure that does not undergo a phase transformation to a spinel crystal structure when incorporated in a lithium-ion battery and cycled for 100 full charge-discharge cycles at 30° C. and a final capacity of 130 mAh/g using a discharge current of 30 mA/g.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-22 is confirmed.

* * * * *